United States Patent [19]

Slater

[11] Patent Number: 4,941,187

[45] Date of Patent: Jul. 10, 1990

[54] INTERCOM APPARATUS FOR INTEGRATING DISPARATE AUDIO SOURCES FOR USE IN LIGHT AIRCRAFT OR SIMILAR HIGH NOISE ENVIRONMENTS

[76] Inventor: Robert W. Slater, 48 W. 938 Chandelle Dr., Hampshire, Ill. 60140

[21] Appl. No.: 300,166

[22] Filed: Jan. 19, 1989

Related U.S. Application Data

[63] Continuation of Ser. No. 134,611, Dec. 15, 1987, abandoned, which is a continuation of Ser. No. 885,331, Jul. 14, 1986, abandoned, which is a continuation of Ser. No. 576,624, Feb. 3, 1984, abandoned.

[51] Int. Cl.⁵ .............................................. H04B 1/00
[52] U.S. Cl. ...................................... 381/86; 381/92; 381/94; 381/74
[58] Field of Search .................... 381/77, 82, 110, 86, 381/92, 94, 74; 379/175

[56] References Cited

U.S. PATENT DOCUMENTS

| | | | |
|---|---|---|---|
| 3,437,758 | 4/1969 | Clement | 379/206 |
| 3,518,375 | 6/1970 | Hawkins | 381/80 |
| 3,992,584 | 11/1976 | Dugan | 381/82 |
| 4,008,376 | 2/1977 | Flanagan | 379/206 |
| 4,154,981 | 5/1979 | Dewberry et al. | 379/175 |
| 4,306,114 | 12/1981 | Callahan | 381/119 |
| 4,352,200 | 9/1982 | Oxman | 455/55 |
| 4,374,300 | 2/1983 | Ponto et al. | 381/119 |
| 4,449,238 | 5/1984 | Lee et al. | 379/206 |
| 4,456,789 | 6/1984 | Groves et al. | 379/202 |
| 4,489,442 | 12/1984 | Anderson et al. | 381/110 |

FOREIGN PATENT DOCUMENTS 2032229  4/1980  United Kingdom .................. 381/81

OTHER PUBLICATIONS

Radio Shack 1982 Catalog (©1981), pp. 55, 50.

*Primary Examiner*—Forester W. Isen
*Attorney, Agent, or Firm*—R. Winston Slater

[57] ABSTRACT

Intercom apparatus having stereo amplifiers adapted for connection to one or more headsets. A plurality of headset output and microphone input connections are provided. Each microphone input includes a separate microphone switch and audio detector whereby only microphone inputs having voice audio thereon are activated. Stereo entertainment and aircraft radio audio inputs are provided. An aircraft radio audio detector is interfaced, along with the various microphone audio detectors, to entertainment partial mute circuitry whereby the presence of a voice or radio audio signal lowers the amplitude of the entertainment input. Microphone and aircraft radio partial mute circuitry are interfaced through a priority selector switch with respective microphone and radio signal detectors. The priority selector switch is a two position, center off arrangement whereby, in one position, aircraft radio signals partially mute microphone signals and in the second position microphone signals partially mute aircraft radio signals. In the center off position no cross muting occurs and the respective signals sum in conventional manner.

16 Claims, 2 Drawing Sheets

INTERCOM APPARATUS FOR INTEGRATING DISPARATE AUDIO SOURCES FOR USE IN LIGHT AIRCRAFT OR SIMILAR HIGH NOISE ENVIRONMENTS

This application is a continuation of application Ser. No. 134,611, filed Dec. 15, 1987, which is a continuation of application Ser. No. 885,331, filed Jul. 14, 1986 which is a continuation of application Ser. No. 576,624, filed Feb. 3, 1984 all abandoned.

BACKGROUND OF THE INVENTION

The present invention relates to intercom apparatus particularly adapted for use in light aircraft. More specifically, the present invention relates to a voice activated intercom enabling hands-free intra-cabin communications between pilot, co-pilot, and passengers including means for interfacing existing aircraft communications and navigation equipment (avionics) and optional stereophonic entertainment sources such an as FM tuner or cassette recorder or the like. In particular, the present intercom incorporates multi-VOX (voice or radio enabled audio) for maximizing voice intelligibility and for activating the partial-mute audio prioritizing circuitry of the present invention. In addition, the partial-mute of the present invention reduces the stereo source volume upon VOX actuation enhancing voice intelligibility without distracting interruption of the stereo audio source.

It is well known that the light aircraft cabin environment is characterized by high engine and slip-stream noise levels which, in turn, contribute to pilot (and passenger) fatigue and, more significantly, severely limit normal intra-cabin conversation, particularly between front and rear seat passengers. In addition, these high noise levels compromise the intelligibility of aircraft radio communications and so detract from the quality of stereo music to render listening unpleasant and impractical. The use of noise cancelling headsets to attenuate these inherent noises greatly reduces pilot fatigue and, where connected to conventional aircraft avionics equipment, improves the radio communications intelligibility. Such headsets are well known to the art. Where multiple users must be accommodated, however, such headsets are commonly interfaced with an intercom system which functions, in part, to electronically interconnect the various headsets and aircraft avionics. The use of aircraft intercoms is also well known to the art. The present invention, therefore, pertains to an improved aircraft intercom system adapted to maximize the users voice intelligibility and to provide an optimum integration between the multiple intercom audio sources, taking into consideration the changing communications requirements occasioned by the ever differing flight conditions.

A principal objective and advantage of any aircraft intercom system is the reduction in aircraft noise and the corresponding improvement in voice or radio intelligibility afforded by the noise cancelling headphones generally used in conjunction with the intercom system. As previously discussed, modern aircraft headsets block substantially all aircraft noise allowing the user to easily understand voice conversation and to appreciate locally generated music, where provided.

Unfortunately, the microphones associates with the various passengers' headsets represent significant potential sources of noise since they are of necessity positioned within the noisey aircraft cabin. Several known aircraft intercom systems have addressed this problem by incorporating voice actuated circuitry (VOX) to simultaneously enable the several headset microphones, but only when voice audio is detected from any one of the microphones. This prior art arrangement has proved somewhat satisfactory at least to the extent that noise entering these microphones is not amplified nor transferred to the occupants' headsets until one of the users speaks. In this manner the fatigue level is substantially reduced as virtually no noise is present in the headsets during periods of non-conversation. However, when any one of the occupants speaks, substantial noise is present due to the summation of aircraft noise contributed by the plurality of simultaneously enabled headsets.

Therefore, this solution, which reduces fatigue caused by the constant drone of the aircraft, does little to enhance the voice intelligibility of any given cabin occupant. The noise, switched 'off' during lulls in conversation, is again present in the headsets whenever an occupant speaks. More specifically, conventional aircraft intercoms interconnect all passenger (or crew) microphones to a common VOX arrangement which functions to enable all such microphones upon the detection of legitimate voice audio from any one microphone. Due to the nature of these prior art VOX circuits, 'information' identifying which passenger, at any given instant, is speaking is lost and, therefore, the single output from these prior art VOX circuits must necessarily and simultaneously enable all microphones. It will be appreciated that enabling all aircraft microphones, where only one is in use, causes additional noise from the 'inactive' microphones to be needlessly added to the voice signal thereby reducing the signal-to-noise ratio and the corresponding intelligibility of the desired voice signal. For example, in a system used by four occupants, noise from all four microphones is added to the voice audio signal from the one active microphone. One voice signal—four noise 'signals'.

The present invention, by contrast, utilizes a multi-VOX arrangement wherein 'information' identifying which microphone(s) is active selectively enables only that microphone(s). Thus, in the above example, only one 'noise' signal, rather than four, is added to any given voice signal. In this manner the voice signal-to-noise ratio and intelligibility are significantly improved over conventional intercom systems.

It has also been found that music is quite pleasurable in light aircraft where, as described above, proper noise cancelling headsets are employed. Music is conventionally accommodated by interfacing a stereo FM tuner or cassette tape player with an aircraft intercom. In addition, it is generally desirable to interface the aircraft avionics equipment into the intercom to permit the pilot to communicate with, or monitor, the various aviation frequencies as required for the safe conduct of the flight. Thus, as many as three or more disparate audio sources may be operatively connected through the intercom at any given time. It will, therefore, be appreciated that a proper 'mix' or integration between these various intercom inputs is required in order that each of these audio input sources may be utilized to the maximum potential. As will be described in more detail below, the present invention provides a truly unique and functional interplay between the intracabin intercom, air-to-ground communications, and music sources wherein each attains a high degree of utility approaching that which would obtain were the given source the only source.

Intercoms known to the art have never achieved a very satisfactory or high level of input source integration. Severe source integration limitations, characteristic of prior art intercoms, often restrict the use of these intercoms to one 'function' at a time or, alternatively, segregate the various aircraft occupants into groups, each group utilizing the intercom system only in its partial capacity. For example, it has long been recognized that music can interfere with important air-to-ground communications and, consequently, one known prior art approach restricts music listening to the passengers and, similarly, the radio communications to the pilots. This, of course, is highly unsatisfactory since many passengers enjoy listening and following the progress of the flight by monitoring the air-to-ground communications and feel more a part of the flight when privy to such communications. At least as important, this solution is entirely unsatisfactory since it precludes the pilot from the highly enjoyable music feature of the intercom system.

Recognizing that segregation of aircraft occupants is highly unsatisfactory, other known systems have adopted a music muting arrangement whereby audio from either the communications radio or a passenger's microphone totally 'mute' the music. Although this arrangement assures maximum voice intelligibility, the repeated and nearly constant interruption or 'punctuation' of the music occasioned by routine radio communications, particularly when monitoring a busy ATC frequency or unicom channel, or by 'idle' cabin chatter has been found to be unduly distracting and annoying to the extent that passengers refuse to talk while the music is playing. In addition, the annoyance of repeated interruptions during an IFR flight usually requires that the music simply be turned-off.

The present invention, by contrast, incorporates a partial mute arrangement whereby the level or volume of the music is significantly, but not totally, reduced whenever an intercom microphone or communications radio audio signal is present. It has been found that reducing the level of music affords a high degree of voice audio intelligibility without the obnoxious interruptions common to prior art total mute systems. In fact, experiments demonstrate that a relatively large reduction in volume can be implemented with only a barely perceptible loss of music listening pleasure. Therefore, it will be appreciated that the partial mute of the present invention permits all occupants of the aircraft, including the pilot, to enjoy the full benefit of airborne music even when monitoring crowded ATC frequencies or engaging in protracted intra-cabin conversations.

Another difficulty with known intercom systems is audio source interference arising between regular intra-cabin intercom usage and aircraft radio reception. It is, simply, difficult, if not impossible, to listen to and comprehend two voices at the same time. In addition to this obvious loss of intelligibility, the continuing presence of a 'second' voice is quite distracting to the intercom users. Known prior art systems have wholly failed to address this significant shortcoming. Use of such systems generally requires that the aircraft radios be turned-down during flight or, where radio communications is necessary for instrument flight (IFR) or the like, that normal intra-cabin conversations be discontinued or, at the least, frequently interrupted by the continuous flow of radio transmissions. This, of course, discourages the monitoring of ATC, flight watch, or unicom frequencies during visual (VFR) flight and, importantly, severly restricts the utility of the intercom for normal intra-cabin conversation during IFR flight.

The present invention solves this source integration problem by combining the features of partial muting, discussed above, with pilot selectable intercom/aircraft radio priority. In arriving at the present arrangement, it was first recognized that changing flight conditions necessarily alter the relative importance of the respective audio source inputs. Thus, for example, on a clear day, the flight might be conducted with only marginal interest and attention given to the aircraft radio while, on an instrument flight in bad weather, aircraft radio communication is paramount in importance. But notwithstanding the relative importances assigned to the various intercom inputs during a given flight, or flight segment, it remains highly desirable and necessary to accommodate the relatively lesser importance inputs. Thus, during a VFR flight where intra-cabin conversation will likely be given priority over the aircraft communications radio, monitoring of certain radio channels such as flight-watch and unicom is highly desirable—so long as such monitoring can be effectuated without obnoxious interruption to intra-cabin use of the intercom. During instrument flight conditions, by contrast, the communications radios may well be given priority but, again, it remains desirable to accommodate normal intra-cabin intercom usage. The present invention accomplishes these objectives. First, it permits the pilot to select the input to be given 'higher' priority during any given flight segment. Second, an audio signal from the non-selected input is assured. The use of the present partial mute feature, discussed above with respect to the stereo input source, is essential to the extent that total muting of the non-selected input does not permit the occupants to 'keep-tabs' on the activities of such non-selected source. In short, the partial mute feature places the non-selected audio 'in the background' whenever the prioritized input is active. This has been found to facilitate the monitoring of such audio source as the users can, notwithstanding the reduction in audio level, still obtain the 'gist' of the activity on that input.

It is therefore an object of the present invention to provide an intercom adapted for use in light aircraft or other high noise environments. It is a further object that the intercom shall be capable of efficiently integrating several audio sources including, for example, user microphone audio, communications audio, and entertainment program audio. The intercom shall maximize audio source intelligibility by reducing environmental noise and by reducing interference between competing intercom input sources. In furtherance of these objects, each user shall be provided with a separate intercom input and, preferably, with separate voice activation circuits whereby only the microphones of those persons actually speaking at any given instant shall be enabled. Partial muting shall be provided on the entertainment input source to facilitate reduction of the level whenever user microphones or other important input sources are active. Selectable input priority shall be combined with partial muting to enable the pilot to choose the input to be assigned the highest priority and to automatically lower the audio signal level of those non-selected inputs.

DESCRIPTION OF THE PREFERRED EMBODIMENT

Figures 1, 2:
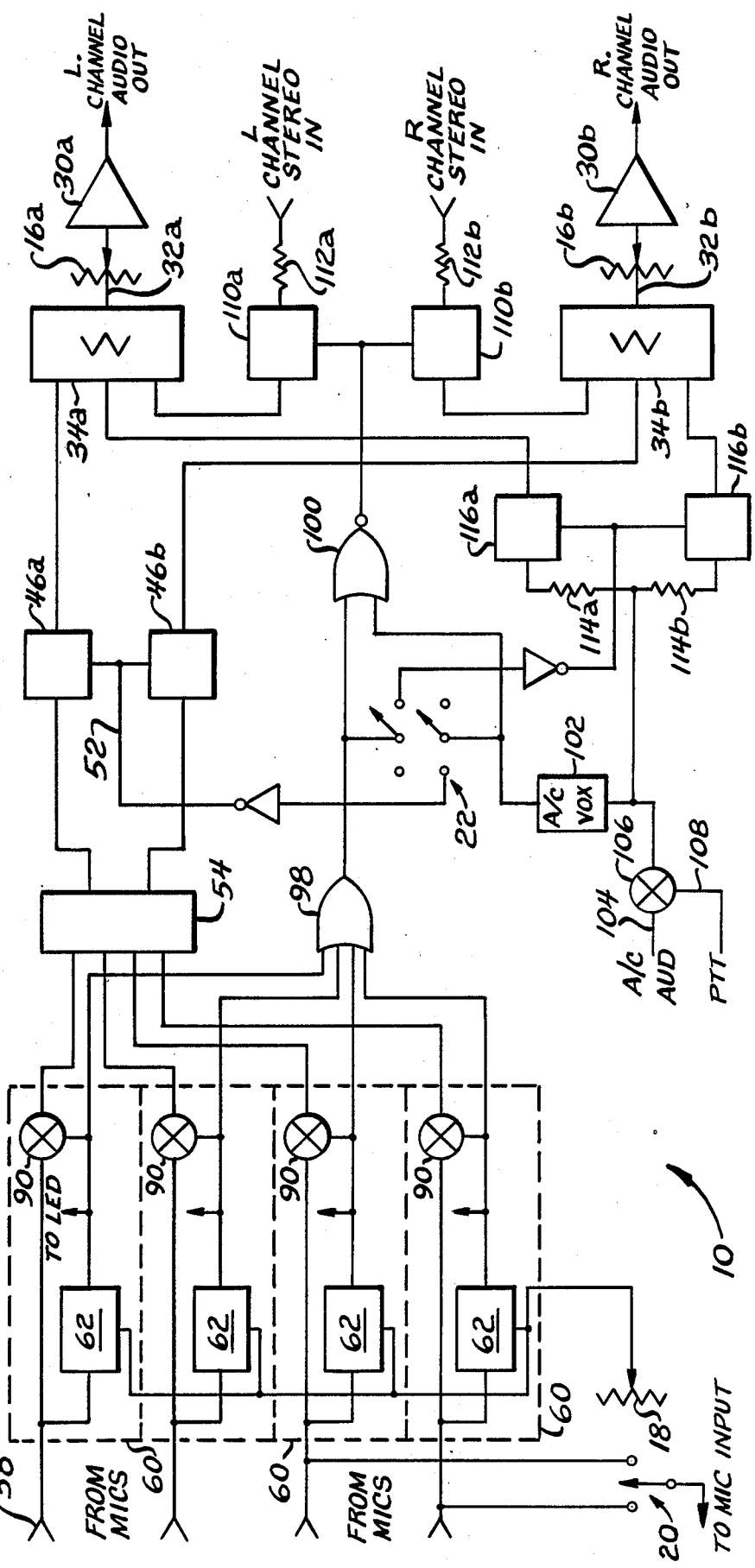
FIG. 1 shows a panel arrangement for the aircraft intercom of the present invention.
FIG. 2 is a block representation of the present intercom configured for stereo, four-user operation.

A typical panel arrangement for the aircraft intercom 10 of the present invention is illustrated in FIG. 1. Front panel headset and microphone access is provided, generally for two users, at jacks 12 and 14 respectively. To avoid front panel cluttering, connection to the intercom by other passengers is made through a rear chassis connector (not shown). A master volume control 16 simultaneously varies the audio output level to all user headsets. Individual volume controls may preferably be incorporated on each user's headset to permit the selective adjustment of volume as desired. A voice activation (VOX) sensitivity control 18 facilitates compensation for changing noise conditions which often occur in response to aircraft engine power settings or changes in aircraft speed. An aircraft radio microphone switch 20 permits the selective interconnection of either the pilot's or co-pilot's microphone to the aircraft radio for air-to-ground communications. Priority switch 22 selects between three differing priority conditions thereby allowing the pilot to change the 'weighting' assigned to the various intercom inputs in accordance with changing flight conditions. Finally, indicators 24 provide a visual indication of mic enabling VOX activity. The functions of these items is discussed in more detail below.

It will be appreciated that the present panel may be rearranged to include or delete controls, connectors, switches or indicators without departing from the scope of the invention.

FIG. 2 is a block representation of the present intercom 10 configured for stereo, four-user operation. The present invention may equally be utilized with, or in, a 'mono' arrangement, or, with greater or fewer users as will become apparent from the following descriptions. A pair of integrated amplifiers 30a,b are provided for left and right channels, respectively. These amplifiers are necessary to boost the relatively lower voltage signal levels from the microphones, aircraft radio, and stereo inputs to the higher voltage and power levels necessary to drive typical aircraft stereo headsets. The output of amplifiers 30 should preferably be of low impedance, 1 to 10 ohms or less, in order to assure proper operation when connected to a plurality of headsets. Satisfactory operation has been achieved with the National Semiconductor LM-380 integrated amplifier. This device exhibits a fixed voltage gain of approximately 34 and has sufficient power output capability to drive any reasonable number of headsets. The LM-380 is merely representative and other amplifiers, including discrete transistor arrangements, may be used with similar results.

Figure 3:
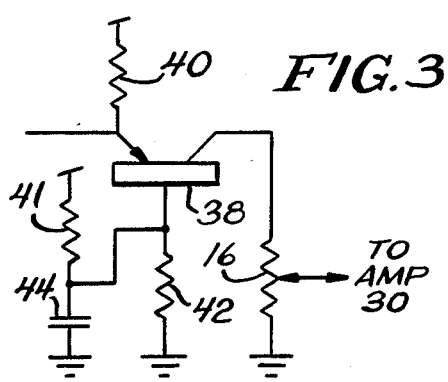
FIG. 3 shows an embodiment of a signal summer.

Front panel volume controls 16a and 16b vary the level of the summed audio signals 32a,b connected to the input of amplifiers 30a,b. Controls 16a and 16b may be ganged for simultaneous volume adjustment of both the left and right channels or they may be independently operable thereby permitted 'balancing' of the respective channel outputs. Signal summers 34a,b combine the various audio signals into respective left and right summed signal outputs 32a,b. Signal summers 34 may be of any conventional type although a discrete common-base transistor current summing arrangement such as shown in FIG. 3 has proven quite satisfactory. Biasing of summer transistor 38 is accomplished in the conventional manner using resistors 40, 41, and 42. Capacitor 44 functions as a by-pass for signal energy thereby electrically grounding the base of transistor 38 for audio signals.

Figure 4:
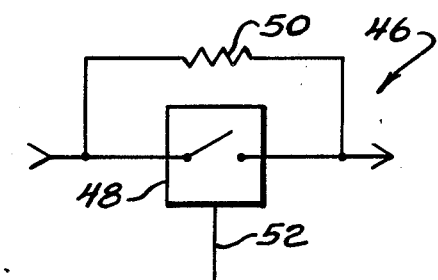
FIG. 4 shows an embodiment of the partial-mute gates of the invention.

The principal intercom voice audio input to summers 34a,b is from partial-mute gates 46a,b shown in more detail in FIG. 4. Each partial-mute gate includes an electronic switch 48 having a partial-mute resistor 50 bridged from switch input to output. Switch 48 exhibits substantially open circuit characteristics when the control voltage on gate line 52 is 'low' and a substantially short circuit or low impedance characteristic when the gate control line is 'high'. Switch 48 may be a conventional bi-lateral integrated circuit analog switch commonly known within the trade as a "4016" or it may be a junction FET device. Satisfactory results have been obtained with either approach.

The partial-mute operation of the present invention cannot be achieved using a standard electronic switch 48 as the high open circuit impedance of the switch totally mutes the incoming audio signal. Therefore, a bridging resistor 50 must be provided to establish a predetermined maximum resistance through partial-mute gate 46. Operation of the partial-mute gate 46 is as follows. In the 'non-mute' mode, switch 48 is electrically closed thereby effectively shorting resistor 50. In the 'partial-mute' mode, switch 48 is opened thereby connecting bridging resistor 50 in series with the respective summing resistor 56, FIG. 5. The reduction in intercom gain is determined by the ratio between resistor 56 and the sum of resistors 50 and 56.

Figure 5:
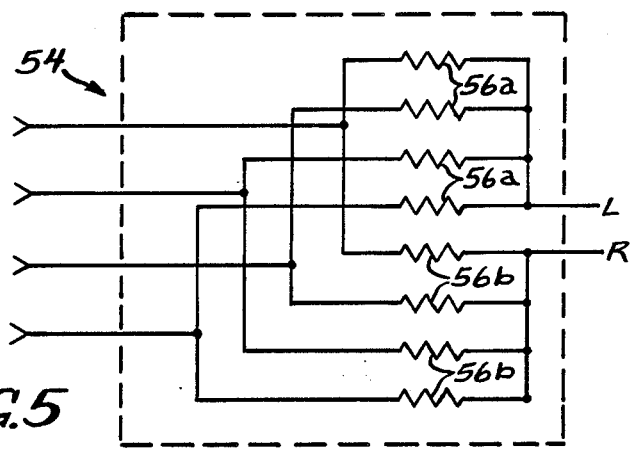
FIG. 5 shows an embodiment of a channel splitter.

The inputs to partial-mute gates 46 are derived from microphone combiner/splitter 54. Splitter 54 functions to combine the several audio microphone signals and to provide separate left and right channel outputs representative of this composite microphone audio signal. FIG. 5 illustrates a preferred arrangement for splitter 54 wherein a pair of resistors 56a,b interconnect each microphone audio input with respective left and right channel splitter outputs. Proper left/right channel separation or isolation is assured with splitter 54 by reason of the relatively high value of resistors 56 in comparison to the input impedance of summers 34.

Each user's microphone is connected to an appropriate splitter 54 input through its own audio switch 90 which, in turn, is enabled by a voice operation circuit (VOX) 62 dedicated to the particular microphone/-switch combination. In this manner, aircraft noise induced in the several microphones 58 is blocked from reaching splitter 54 until voice audio is detected by the respective microphone VOX circuit 62. Significantly, VOX 62 actuation of any given switch 90 and microphone 58 does not simultaneously activate the remaining microphones. Thus, the high level multi-microphone noise ordinarily present in conventional aircraft intercom systems upon activation of any given VOX is avoided by the present multi-VOX arrangement wherein only those microphones having valid voice audio signals are enabled.

Figure 6:
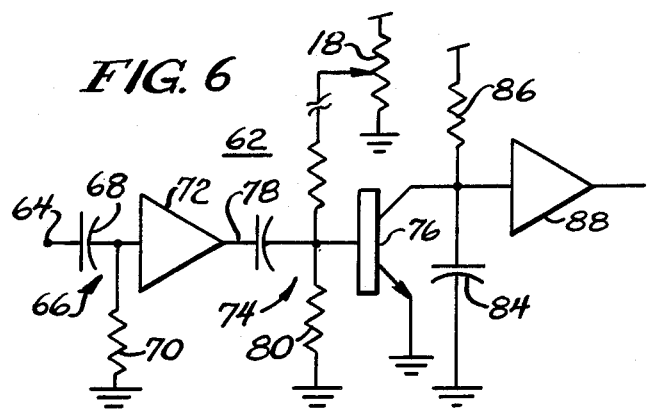
FIG. 6 illustrates the independent microphone voice activation (VOX) circuitry of the invention.

Microphone audio switches 90 are preferably integrated analog switches such as a "4016". Alternatively, discrete FET switches may be employed. FIG. 6 illustrates the independent microphone voice activation (VOX) circuitry of the present invention. The voice audio signal 64 is passed through a single section high pass filter 66 comprising capacitor 68 and resistor 70 to the input of preamplifier 72. Preamplifier 72 may be an operational amplifier or discrete common emitter transistor amplifier. The gain of amplifier 72 is selected to provide approximately a 200–500 millivolt peak voice audio output. A gain of approximately 2 has been found to be satisfactory for use with the David-Clark model H10–30 aircraft headset. High pass filter 66 passes most of the voice audio, particularly the higher frequencies above 500 Hertz, while blocking the very low audio frequencies comprising much of the detrimental aircraft engine noise. In this manner, improved voice activation results by raising the relative magnitude of the voice audio signal with respect to the noise signal.

The amplified voice audio signal from preamplifier 72 is passed through a second high pass filter 74 to a silicon VOX switching transistor 76. Filter 74 is comprised of series capacitor 78 and resistors 80, 82, and VOX potentiometer 18. Capacitor 78 functions additionally to DC block or decouple preamplifier 72 and switch 78 while resistors 80, 82, and 18 serve, also, to bias switching transistor 76. More specifically, resistors 80 and 82 comprise a conventional voltage divider network connected to the wiper of DC VOX sensitivity potentiometer 18. Potentiometer 18 is connected across a DC voltage source, for example an 8 volt regulated supply, with the ratio of resistors 80 and 82 being selected to provide between zero and about 0.8 volts to the base of transistor 76 as control 18 is advanced to the maximum sensitivity position. A single DC VOX sensitivity potentiometer 18 is utilized for all voice activation circuits 62 and, therefore, a plurality of resistors 82, corresponding to the number of independent microphone VOX circuits employed, are connected to the wiper of control 18. In this manner, the biasing of all VOX switching transistors 76 is simultaneously adjusted. And, as discussed in more detail below, the voice threshold required to activate all microphones is similarly simultaneously adjusted by control 18.

For normal operation of each VOX 62, sensitivity control 18 is adjusted such that switching transistor 76 is nominally turned-off. For silicon transistor 76, a base bias voltage of less then about 0.6 volts assures proper transistor turn-off. The output or collector of switching transistor 76 is connected to a VOX drop-out delay timer comprised of timing capacitor 84 in series with current source resistor 86 which, in turn, is connected to a high input impedance switch 88. Switch 88 may be an operational amplifier or high gain discrete transistor amplifier. An NPN darlington pair has proven quite satisfactory and requires little additional biasing circuitry. With transistor 76 "off", timing capacitor 84 is charged to a positive potential through resistor 86 which, in turn, turns switch 88 "on" corresponding to a "low" signal level at the output of switch 88 and the voice activation circuit 62.

During intervals of non-conversation, a relatively low level signal, representing the aircraft noise only, is present at the output of preamplifier 72. The VOX sensitivity control is adjusted such that the corresponding DC bias voltage, when summed with this low level noise signal, is less than the threshold of approximately 0.6 volts necessary to turn switch 76 "on". Thus, switch 76 remains "off", timing capacitor 84 remains charged, and switch 88 remains "on" with its corresponding low output level. In this manner, a low level DC signal is generated by each VOX circuit for connection to the respective analog microphone switches 60. When voice audio is present from any microphone on VOX input line 64, a significantly higher level voice audio signal is available from preamplifier 72 which, when added to the DC bias voltage set by control 18, is greater than the threshold base voltage required to turn switch 76 "on". Therefore, on each positive audio cycle transistor 76 is turned "on" which, in turn, rapidly discharges timing capacitor 84. The low voltage discharged condition of timing capacitor 84 causes switch 88 to turn "off" and the output of VOX 62 to become "high". The high level output from VOX switch 60 enables the appropriate microphone. The microphone remains enabled following cessation of speaking until timing capacitor 84 is again charged through resistor 86. A time constant in excess of $\frac{1}{2}$ second is generally required to assure continuous microphone activation during momentary syllable or word pauses.

Figure 7:
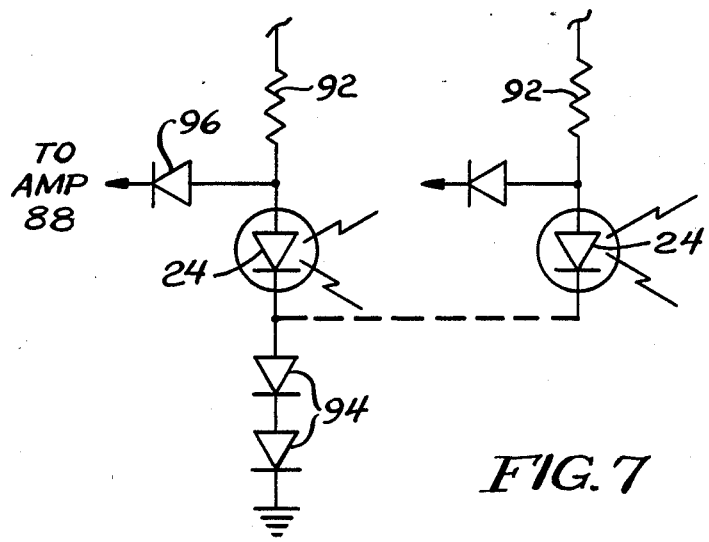
FIG. 7 shows an arrangement of LED's for voice activity indication.

The outputs of the several VOX switches 88 are also connected to respective light emitting diode voice activity indicators 24 as shown in FIG. 7. Resistor 92 set the current through indicators 24 as required for proper illumination. Level shifting diodes 94 serve to bias-up the indicator 24 cathodes to assure that indicators 24 fully extinguish when the indicator anodes are pulled-low through respective isolation diodes 96.

Each VOX 62 output is further connected to an input of an OR gate 98. Gate 98 may be of conventional integrated circuit design or it may be implemented using diodes summed at a common output junction. This latter approach has been found quite satisfactory. Gate 98 provides a high level output signal indicative of voice actuation of at least one microphone VOX 62. This signal is connected to priority selector switch 22 and as one of two inputs to OR gate 100. Again, gate 100 may be implemented either with diodes or integrated circuitry. The second input to OR gate 100 is provided from aircraft radio activity detector 102. Activity detector output is also connected to a second pole of priority selector switch 22. Radio activity detector 102 is an audio activated switch substantially identical to the voice VOX circuits 62 previously considered but, instead, the audio input to detector 102 is the aircraft receive audio 104 as passed through analog switch 106. The gate 108 of analog switch 106 is connected to the aircraft radio push-to-talk line which functions to inhibit audio from the aircraft receivers and audio panel during aircraft radio transmissions. In this manner, any sidetone audio from the aircraft radios is inhibited thereby precluding distortion inducing interference between the locally generated intercom voice audio and the same voice audio as returned as aircraft radio sidetone signals.

Thus, the output of OR gate 100 is a signal representative of either intra-cabin intercom usage (i.e. activation of at least one VOX 62) or receipt of an aircraft radio transmission (i.e. activation of radio activity detector 102). This output signal is connected to the gate inputs of both the left and right stereo partial-mute audio analog switches 110a,b which are substantially identical to the voice partial-mute switches 46 of FIG. 4, previously considered. In this regard, the stereo input audio, connected through summing resistors 112a,b and partial-mute switches 110a,b as second inputs to summing amplifiers 34a,b, is automatically lowered approximately 6-12 db whenever aircraft radio or intercom voice activity is detected. It will be appreciated that the partial muting of the stereo music input provides for enhanced radio and voice intelligibility while simultaneously maintaining a sufficient music listening level which is essentially devoid of distracting interruptions.

The aircraft receive audio forms a third input to summing amplifiers 34a,b. This signal is split into left and right channel signals by a pair of summing resistors 114a,b then passed through partial-mute switches 116a,b to summing amplifier 34a,b. Again, the aircraft receive audio partial-mute switches 116 function substantially identically to the previously considered voice partial-mute switches 46a,b of FIG. 4. The control gates of switches 116a,b are connected to the three position priority switch 22.

In the center-off position, the control gate inputs to both the intercom voice and aircraft radio partial-mute switches are electrically open-circuited thereby disabling the respective partial mute circuitry and the priority function. Thus, aircraft avionics audio and intercom voice audio are summed and heard substantially equally. When priority select switch 22 is moved to the 'headset' position (corresponding to the illustrated right-hand position of FIG. 2), the OR'd output from gate 98 is connected, through an inverter, to aircraft radio partial mute gates 116a,b. This, in turn, partially mutes the aircraft audio whenever microphone audio is detected thereby assuring maximum voice intelligibility of the aircraft occupant. It will be observed, however, that the aircraft audio signal remains 'in-the-background' permitting the pilot to maintain a general watch on the selected radio frequencies.

In similar fashion, repositioning of the priority switch 22 to the 'a/c radio' (left-hand) position connects the output of the aircraft radio audio detector (VOX) 102, through an inverter, to microphone partial mute gates 46a,b. This, in turn, causes the voice level of aircraft occupants to be reduced whenever radio transmissions are present thereby assuring full radio intelligibility as may be required, for example, during instrument flight conditions. Partial microphone muting avoids the obnoxious and rude interruptions occasioned with complete muting while simultaneously avoiding interference with important radio transmissions common where muting is unavailable. It will be appreciated that changing flight conditions result in corresponding changes in the relative importance of the various audio inputs. Thus, the selectable priority switching with partial muting of the present invention adds a highly versatile system for altering the hierarchy of the input audio sources in response to these changing conditions.

A microphone select switch 20 interfaces the pilot and co-pilot microphones with the transmit audio input of the aircraft avionics. This front panel mounted switch permits radio connection of either the pilot's or co-pilot's microphone at any given instant. Thus, only one occupant may communicate over the aircraft radios at a time; although the received radio transmissions will be heard by all. It will be noted that a separate push-to-transmit (PTT) button, not forming a part of the present invention, is required to actually place the avionics equipment in the transmit mode. The mere positioning of switch 20 does not cause transmission of the selected microphone audio but rather determines which microphone audio source will be transmitted when the external transmit PTT button is actuated.

What is claimed is:

1. Apparatus for integrating disparate audio sources for use in light aircraft or in other high noise environments comprising unitary driver means for generating a composite output signal representative of a driver input signal, audio output means associated with the output of the driver means for connection of a plurality of remote headsets whereby a substantially identical composite output signal will be present at all of the headsets without regard to the source of audio comprising said composite output signal; audio signal summation means operatively connected to the driver input having a plurality of audio inputs for connection of remote microphones, each remote microphone being associated with and proximate to a headset whereby an occupant of the aircraft may speak into a microphone and listen to the composite output signal, including the voice audio of said occupant, through the associated headset, said audio summation means funtioning to combine the respective audio inputs to form a single composite signal; each summation means audio input including an associated audio switch means, audio detector means, and audio input means for connection of an audio input signal thereto; each audio switch means connected in series between the associated summation means audio input and the audio input means, and each audio switch means having a gate means whereby the switch means may be selectively controlled to a first closed-circuit condition whereby an audio input signal at the associated audio input means is substantially connected to the summation means audio input and a second open-circuit condition whereby an audio input signal at the associated audio input means is substantially removed from said audio input; each audio signal detector means being operatively connected to the gate means of the associated switch means and to the associated audio input means, each detector means being unresponsive to audio input signals on other than the associated audio input means, whereby the detector means controls the associated switch means into the first closed-circuit condition whenever an audio input signal of predetermined amplitude is present at the associated audio input means without regard to the input signal condition on any other audio input means and into the second open-circuit condition following a predetermined interval in which an audio input signal at the associated audio input means has not exceeded the predetermined amplitude whereby only audio input signals having a predetermined amplitude contribute to the driver means output signal thereby improving the audio quality by eliminating noise present on unused audio signal inputs.

2. Apparatus for integrating disparate audio sources, including microphone signals and other non-microphone input signals, for use in light aircraft or in other high noise environments comprising unitary driver means for generating a composite output signal representative of a driver input signal, audio output means associated with the output of the driver means for connection of a plurality of remote sound transducer means thereto whereby a substantially identical composite output signal will be present at all of the remote sound transducer means without regard to the source of audio comprising said composite output signal; audio signal summation means operatively connected to the driver input having microphone input means and other input means, said audio summation means functioning to combine respective microphone and other input means to form a single composite signal; means for interconnecting microphone signals to the microphone input means in response to predetermined minimum microphone signal levels, said interconnecting means including switch means and microphone signal detector means; switchable mute means for interconnecting said other non-microphone input signals to the other input means, the mute means operatively connected to the microphone signal detector means such that the amplitude of the other input signals interconnected to the other input means is lowered by a predetermined non-zero fractional degree in response to predetermined minimum microphone signal levels whereby fractionally muting the other signal enhances microphone signal intelligibility without appreciably interrupting the continuity of said other signals.

3. The apparatus for integrating disparate audio sources of claim 2, the disparate audio sources including radio signals, wherein the audio signal summation means includes radio signal input means and including radio signal detector means operatively connected to the other signal mute means whereby the amplitude of the other signal interconnected to the other signal input means is lowered by a predetermined non-zero fractional degree in response to detected radio signals or predetermined minimum microphone signal levels whereby fractionally muting the other signal enhances microphone and radio signal intelligibility without appreciably interrupting the continuity of said other signals.

4. Apparatus for integrating disparate audio sources for use in light aircraft or in other high noise environments comprising unitary driver means with a driver input for generating a composite output signal representative of a driver input signal, audio output means associated with the output of the driver means for connection of a plurality of remote sound transducer means thereto whereby a substantially identical composite output signal will be present at all of the remote sound transducer means without regard to the source of audio comprising said composite output signal; audio signal summation means operatively connected to the driver input having microphone input means and radio input means, said audio summation means functioning to combine outputs from the microphone input and radio input means to form a single composite signal; means for interconnecting microphone signals to the microphone input means in response to predetermined minimum microphone signal levels, said interconnecting means including microphone switch means and microphone signal detector means; radio signal detector means; microphone mute means for lowering the microphone input signal by a predetermined first non-zero fractional degree; radio mute means for lowering a radio input signal at the radio input means by a predetermined second non-zero fractional degree; means for manually selecting priority, said priority selecting means having at least respective microphone and radio priority positions, said priority selecting means coupled to the microphone and radio signal detector means and to the microphone and radio mute means whereby at least one of said microphone or radio signals may be selected and operatively connected to the radio or microphone mute means, respectively, thereby lowering the non-selected input signal by a predetermined fractional degree in response to a detected selected signal whereby fractionally muting the non-selected signal enhances the selected signal intelligibility without interrupting the continuity of the non-selected signal.

5. The apparatus for integrating disparate audio sources of claim 4 including other signal summation input means; other signal mute means operatively coupled to the microphone and radio signal detector means for lowering the other input signal by a predetermined third non-zero fractional degree in response to detected radio or microphone signals whereby fractionally muting the other signal enhances microphone and radio signals intelligibility without appreciably interrupting the continuity of said other signals.

6. The apparatus for integrating disparate audio sources of claim 4 wherein the priority selecting means defines a first radio priority position wherein the radio signal detector means is operatively coupled to the microphone mute means and a second microphone priority position wherein the microphone signal detector means is operatively coupled to the radio mute means.

7. The apparatus for integrating disparate audio sources of claim 6 wherein the priority selecting means defines a third non-priority position wherein the microphone and radio signal detector means are not coupled to the microphone and radio mute means.

8. Aircraft audio intercom apparatus including unitary amplifier means having output means for connecting a plurality of remote headsets whereby the same amplifier output signal is available to each headset; a plurality of input means for connecting microphone audio to each such means, said microphone audio defining a first signal level generally representative of ambient cabin aircraft noise and a second signal level generally representative of said ambient cabin aircraft nosie and voice audio of an aircraft occupant using said microphone; microphone switch means operatively coupling selected microphone input means to the amplifier means; microphone actuator means operatively connected to the switch means and to the input means, said actuator means including means for separately detecting an audio input signal at each of the microphone input means whereby the actuator and switch means automatically couple each input means having said second signal level audio to the amplifier means without regard to audio input signal levels on the remaining audio input means.

9. The aircraft intercom apparatus of claim 8 wherein said switch means is comprised of a plurality of electrically operated switches, one switch interposed between each of said plural audio input means and the amplifier means and wherein said means for separately detecting an audio input signal at each microphone input means includes an audio detector coupled to each of said plural audio input means and to the respective audio input switch.

10. The aircraft audio intercom apparatus of claim 9 including light indicator means operatively coupled to each audio detector thereby providing independent visual indications of voice audio on each microphone input means.

11. Aircraft audio intercom apparatus including unitary amplifier means, means for connecting the output of the amplifier means to a plurality of remote headsets whereby the same amplifier output signal is available to each headset; a plurality of microphone input means; a plurality of microphone switch means, each of the switch means operatively coupling a respective one of the microphone input means to the amplifier means; a plurality of audio detector means, each of the detector means having a detector input operatively connected to one of the audio input means and a detector output representative of the presence of an audio signal on the corresponding input means, the detector output operatively connected to the respective audio switch means associated with said one audio input means whereby only microphone input means having audio signals thereon are coupled to the amplifier means; aircraft radio audio input means operatively coupled to the amplifier means; entertainment input means operatively coupled to the amplifier means; means for partially muting a signal from the entertainment input means; aircraft audio detector means having an input operatively connected to the aircraft audio input means and a detector output representative of the presence of an audio signal on the aircraft audio input means; means operatively interconnecting the microphone detector means and the aircraft audio detector means with the entertainment mute means whereby the level of a signal at the amplifier means from the entertainment means may be partially muted in response to detected microphone input means signal or aircraft radio input means signals.

12. The aircraft intercom apparatus of claim 11 including microphone audio partial mute means and aircraft radio audio partial mute means; priority means selectively interconnecting the microphone and aircraft detector means outputs with the microphone and aircraft partial mute means whereby a signal on one of said microphone and aircraft input means partially mutes a signal on the other of said input means.

13. The aircraft audio intercom apparatus of claim 11 wherein the amplifier means includes stereo left channel amplifier means and right channel amplifier means and wherein the entertainment input means includes stereo left channel input means operatively connected to the left channel amplifier means and right channel input means operatively connected to the right channel amplifier means and including microphone signal splitter means operatively associated with each microphone input means for connecting microphone audio signals to both of said left and right channel amplifier means; aircraft radio signal splitter means operatively coupling the aircraft radio input means to both of said left and right channel amplifier means whereby the monophonic voice microphone audio signals and monophonic aircraft radio audio signals will be present at the output means of both of said amplifier means.

14. The aircraft intercom apparatus of claim 11 including aircraft radio audio switch means having a push-to-talk input whereby signals on the aircraft audio input are gated off in response to a push-to-transmit signal on said push-to-transmit input.

15. Aircraft audio intercom apparatus including unitary amplifier means having output means for connecting a plurality of remote headsets whereby the same amplifier output signal is available to each headset; a plurality of microphone input means; microphone switch means operatively coupling selected microphone input means to the amplifier means; microphone actuator means operatively connected to the switch means and to the input means, said actuator means including means for separately detecting an audio input signal at each of the microphone input means whereby the actuator and switch means automatically couple each input means having an audio signal of predetermined amplitude thereon to the amplifier means without regard to audio input signal levels on the remaining audio input means; wherein the amplifier means includes stereo left channel amplifier means and right channel amplifier means and including microphone signal splitter means operatively associated with each microphone input means for connecting microphone audio signals to both of said left and right channel amplifier means whereby the microphone voice audio signal will be present at the output means of both of said amplifier means.

16. Apparatus for integrating disparate audio sources for use in light aircraft or in other high noise environments comprising unitary driver means for generating a composite output signal representative of a driver input signal, audio output means associated with the output of the driver means for connection of a plurality of remote sound transducer means thereto whereby a substantially identical composite output signal will be present at all of the remote sound transducer means without regard to the source of audio comprising said composite output signal; audio signal summation means operatively connected to the driver input having at least two audio inputs, said audio summation means functioning to combine the respective audio inputs to form a single composite signal; each summation means audio input including an associated audio switch means, audio detector means, and audio input means for connection of an audio input signal thereto; each audio switch means connected in series between the associated summation means audio input and the audio input means, and each audio switch means having a gate means whereby the switch means may be selectively controlled to a first closed-circuit condition whereby an audio input signal at the associated audio input means is substantially connected to the summation means audio input and a second open-circuit condition whereby an audio input signal at the associated audio input means is substantially removed from said audio input; each audio signal detector means being operatively connected to the gate means of the associated switch means and to the associated audio input means, each detector means being unresponsive to audio input signals on other than the associated audio input means, whereby the detector means controls the associated switch means into the first closed-circuit condition whenever an audio input signal of predetermined amplitude is present at the associated audio input means without regard to the input signal condition on any other audio input means and into the second open-circuit condition following a predetermined interval in which an audio input signal at the associated audio input means has not exceeded the predetermined amplitude whereby only audio input signals having a predetermined amplitude contribute to the driver means output signal thereby improving the audio quality by eliminating noise present on unused audio signal inputs; including a single dc level potentiometer operatively interconnected to each of the microphone audio detector means whereby the predetermined detection amplitude of all of the detectors may be simultaneously adjusted.

* * * * *